Sept. 13, 1927.
A. TEBALDI
VALVE PISTON
Filed Dec. 8, 1926
1,642,596
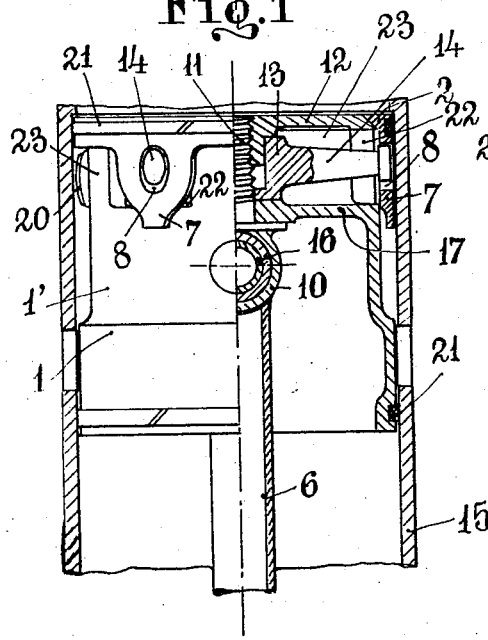
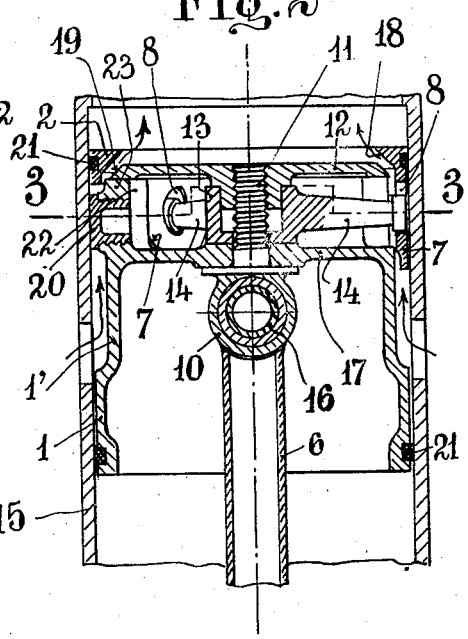
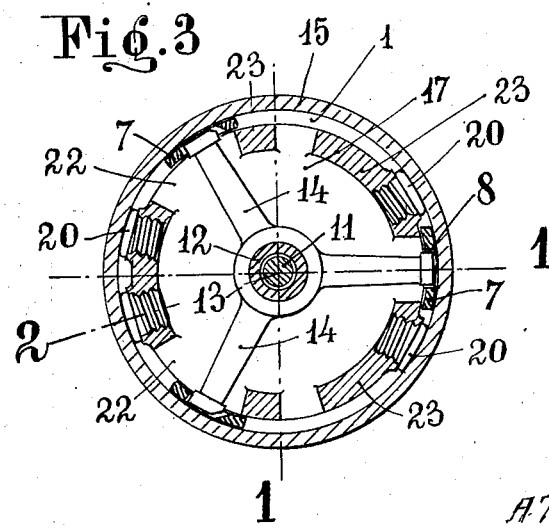
A. Tebaldi, inventor
By Marks & Clark, Attys.

Patented Sept. 13, 1927.

1,642,596

UNITED STATES PATENT OFFICE.

ALESSANDRO TEBALDI, OF MILAN, ITALY.

VALVE PISTON.

Application filed December 8, 1926, Serial No. 153,376, and in Italy April 19, 1926.

The present invention relates to valve pistons of the kind comprising a rim having a valve seat and movably mounted on the body of a piston which provides a cooperating valve seat, and cooperating means on said rim and piston body to provide for a respective movement of the same along a portion of the piston stroke as required for the valve operation.

On the annexed drawing is shown an embodiment of the present invention and

Figure 1 is in part a side view and in part a transverse section on line 1—1 of Figure 3 of a valve piston according to the present invention at the upper end of its stroke with its valve in closed position;

Figure 2 is a transverse section on line 1—2 of Figure 3 with the valve in open position;

Figure 3 is a transverse section on line 3—3 of Figure 2.

As shown in said figures, the piston 1 is arranged to reciprocate in a cylinder 15 and is connected by means of a pivot seat 10 and a pivot 16 with an usual connecting rod 6 cooperating with a crank shaft, not shown.

Said pivot seat 10 is engaged on a partition 17 of the piston by means of a bolt 11 and a piston head 12 is in turn fastened on said bolt 11; a hub member 13 is engaged between parts 17 and 12 and it carries a number of radial arms 14 lying in the space intermediate partition 17 and head plate 12 and extending through spaces 22 left intermediate longitudinal projections 23 of the piston body.

The upper portion 1′ of the piston has a reduced diameter and its top is encircled by a rim 2 having a valve seat surface 18 adapted to cooperate with a similar surface 19 of head 12 and said rim has longitudinal extensions 7 extending along the piston body and provided with elongated openings 8 which are entered by the ends of arms 14.

Position plugs 20 are provided in the restricted portion 1′ of the piston to provide for the correct reciprocation of the piston.

Packing rings 21 are provided in the piston body 1 and rim 2, as illustrated.

As illustrated the openings 8 have an elongated shape to provide for a respective motion of rim 2 with respect to piston body 1′ as required to cause the valve surfaces 18 and 19 to come into contact with and be removed from each other in the valve piston operation, and the cross sectional area and extension of arms 14 are such as to permit for a resilient flexure of said arms in operation.

Assuming the parts to be in the position of Figure 1, on the rod 6 and piston 1 being moved downwardly, the rim 2 is left stationary in the cylinder at the beginning of said downward movement owing to friction of its ring 21 and the free respective motion provided by slots 8 for arms 14 but when the arms 14 are engaging by their ends the lower ends of said slots 8 the valve rim 2 is moved downward, its valve surface 18 being spaced from the piston valve surface 19 thus permitting the flow of fluid along the path shown by arrows in Figure 2; on the contrary during the upward motion of the piston the valve surface 19 of piston head 12 contacts with the valve surface 18 of rim 2 and this rim is moved upwardly with the piston, the cooperating valve surfaces 18—19 being in contact with each other or in valve-closed position.

As above referred to, the arms 14 are somewhat flexible and thus the engagement of valve rim 2 with piston 1, which takes place through the intermediate of said arms 14, is made in a gradual and progressive manner without heavy shocks between the parts.

In the described construction the advantage is secured that the connection of rim 2 with piston body 1 is made independent from means for connecting the piston body with the crank rod and that the interconnecting means between said rim and piston may be distributed in a number of points over the periphery of said rim.

Of course the present invention is not restricted to the above described construction which has beeen described by way of example, and it may be modified in various manners within the spirit of appended claims particularly with respect to number and arrangement of the interconnecting members between the piston body and valve rim.

What I claim as my invention and desire to secure by U. S. Letters Patent is:

1. A valve piston comprising a piston body having a valve surface, a rim mounted to move on said body and having a valve surface adapted to cooperate with said piston-body valve-surface, said piston body and rim having cooperating projections and slots for a lost motion interconnection of the same, and said projections being flexible to provide for a quiet engagement of said valve rim and piston body.

2. A valve piston comprising a piston body having a valve surface, a rim mounted to move on said body and having a valve surface adapted to cooperate with said piston-body valve-surface, said piston body and rim having cooperating projections and slots for a lost motion interconnection of the same, and said projections being long to provide a flexible and quiet engagement of said valve rim and piston body.

3. A valve piston comprising a piston body having a valve surface, a rim mounted to move on said body and having a valve surface adapted to cooperate with said piston-body valve-surface, lugs extending from said rim along said piston body and having slots elongated in the direction of the piston axis and arms extending from said piston body and engaging said slots with lost motion.

4. A valve piston comprising a piston body having a valve surface, a rim mounted to move on said body and having a valve surface adapted to cooperate with said piston-body valve-surface, lugs extending from said rim along said piston body and having slots elongated in the direction of the piston axis and flexible arms extending from the said piston body and engaging said slots with lost motion.

5. A valve piston comprising a piston body having a valve surface, a rim mounted to move on said body and having a valve surface adapted to cooperate with said piston-body valve-surface, a plurality of lugs at spaced points of the periphery of said rim and each having a slot elongated in the direction of the piston axis, and a spider on said piston body having a plurality of arms each engaging one of said slots with lost motion.

6. A valve piston comprising a piston body, a bolt extending along the axis of the same, a hub located on said bolt, radial arms projecting from said hub, a piston head disk secured on said bolt and fastening said hub in position, said piston head disk having a valve surface on its edge, a rim encircling said piston head disk and having a valve surface adapted to cooperate with said piston-head-disk valve-surface, and lugs extending longitudinally from said rim and having slots elongated in the direction of the piston axis, said arms being long and flexible and engaging said slots with lost motion.

7. A valve piston comprising a piston body, a bolt providing means for connecting said piston body with an associate crank rod and extending along the piston axis, a hub located on said bolt, radial arms projecting from said hub, a piston-head-disk having a valve-surface on its edge, said disk being secured on said bolt and fastening said hub in position, a rim encircling said piston head disk and having a valve surface adapted to cooperate with said piston-head-disk valve surface, lugs extending longitudinally from said rim and having slots elongated in the direction of the piston axis, said arms being long and flexible and engaging said slots with lost motion.

ALESSANDRO TEBALDI.